United States Patent
Golsch

(10) Patent No.: US 10,706,651 B2
(45) Date of Patent: Jul. 7, 2020

(54) SYSTEMS AND METHODS FOR COMMUNICATION BUS SECURITY IN A VEHICLE

(71) Applicants: DENSO International America, Inc., Southfield, MI (US); DENSO CORPORATION, Kariya, Aichi-pref. (JP)

(72) Inventor: Kyle Golsch, Pontiac, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/359,116

(22) Filed: Mar. 20, 2019

(65) Prior Publication Data

US 2019/0304225 A1 Oct. 3, 2019

Related U.S. Application Data

(60) Provisional application No. 62/648,987, filed on Mar. 28, 2018.

(51) Int. Cl.
*G07C 9/00* (2020.01)
*H04L 12/40* (2006.01)
(Continued)

(52) U.S. Cl.
CPC ......... *G07C 9/00309* (2013.01); *G06F 21/35* (2013.01); *G06F 21/445* (2013.01);
(Continued)

(58) Field of Classification Search
CPC ........ G06F 21/35; G06F 21/445; G06F 21/73; G06F 2221/2103; G07C 2009/005;
(Continued)

(56) References Cited

U.S. PATENT DOCUMENTS 8,930,045 B2 1/2015 Oman et al.
9,123,244 B2 9/2015 Daman et al.
(Continued)

FOREIGN PATENT DOCUMENTS

BR 102014017465 A2 2/2016
CN 104574593 A 4/2015
(Continued)

*Primary Examiner* — Yong Hang Jiang
(74) *Attorney, Agent, or Firm* — Harness, Dickey & Pierce, P.L.C.

(57) ABSTRACT

Systems and methods are provided and include a sensor that is configured to generate a first link key data packet. A control module of a vehicle is configured to generate a second link key data packet. In response to (i) a first authenticated response of the first link key data packet matching a second authenticated response of the second link key data packet and (ii) a user device being connected to a communication gateway of the control module by a Bluetooth low energy (BLE) communication link, the sensor is configured to communicate signal information to the control module using a hardwire link that electrically couples the control module and the sensor. The signal information includes information corresponding to physical characteristics of the BLE communication link.

20 Claims, 9 Drawing Sheets

(51) Int. Cl.
  *H04L 29/06* (2006.01)
  *H04L 9/32* (2006.01)
  *H04W 12/06* (2009.01)
  *G06F 21/35* (2013.01)
  *G06F 21/73* (2013.01)
  *H04W 12/12* (2009.01)
  *H04L 9/12* (2006.01)
  *H04W 12/00* (2009.01)
  *G06F 21/44* (2013.01)
  *H04W 4/40* (2018.01)
  *H04L 29/08* (2006.01)

(52) U.S. Cl.
  CPC ............... *G06F 21/73* (2013.01); *H04L 9/12* (2013.01); *H04L 9/3271* (2013.01); *H04L 12/40* (2013.01); *H04L 63/0838* (2013.01); *H04W 12/003* (2019.01); *H04W 12/00512* (2019.01); *H04W 12/00518* (2019.01); *H04W 12/06* (2013.01); *H04W 12/1204* (2019.01); *G06F 2221/2103* (2013.01); *G07C 2009/005* (2013.01); *G07C 2009/00547* (2013.01); *G07C 2009/00555* (2013.01); *G07C 2209/63* (2013.01); *H04L 67/12* (2013.01); *H04L 2012/40215* (2013.01); *H04L 2012/40234* (2013.01); *H04L 2012/40273* (2013.01); *H04L 2209/805* (2013.01); *H04L 2209/84* (2013.01); *H04W 4/40* (2018.02)

(58) Field of Classification Search
  CPC ........... G07C 2009/00547; G07C 2009/00555; G07C 2209/63; G07C 9/00309; H04L 12/40; H04L 2012/40215; H04L 2012/40234; H04L 2012/40273; H04L 2209/805; H04L 2209/84; H04L 63/0838; H04L 67/12; H04L 9/12; H04L 9/3271; H04W 12/003; H04W 12/00512; H04W 12/00518; H04W 12/06; H04W 12/1204; H04W 4/40
  USPC .......................... 340/5.1, 5.7, 5.72
  See application file for complete search history.

(56) References Cited

U.S. PATENT DOCUMENTS

| | | | |
|---|---|---|---|
| 9,688,247 B1 | 6/2017 | Jayaraman et al. | |
| 9,794,753 B1 | 10/2017 | Stitt et al. | |
| 9,894,492 B1 | 2/2018 | Elangovan et al. | |
| 10,002,479 B2 | 6/2018 | Oz et al. | |
| 2009/0106563 A1* | 4/2009 | Cherpantier | G06F 21/86 713/194 |
| 2011/0215921 A1 | 9/2011 | Ben Ayed et al. | |
| 2012/0045058 A1 | 2/2012 | Weghaus | |
| 2013/0214732 A1 | 8/2013 | Nowottnick | |
| 2014/0152091 A1 | 6/2014 | Muller et al. | |
| 2014/0188348 A1 | 7/2014 | Gautama et al. | |
| 2014/0240091 A1 | 8/2014 | Talty et al. | |
| 2014/0274013 A1 | 9/2014 | Santavicca | |
| 2014/0330449 A1 | 11/2014 | Oman et al. | |
| 2015/0148989 A1 | 5/2015 | Cooper et al. | |
| 2015/0161832 A1 | 6/2015 | Esselink et al. | |
| 2015/0161834 A1 | 6/2015 | Spahl et al. | |
| 2015/0310681 A1 | 10/2015 | Avery et al. | |
| 2015/0356797 A1 | 12/2015 | McBride et al. | |
| 2016/0012653 A1* | 1/2016 | Soroko | G07C 5/008 340/5.61 |
| 2016/0050563 A1 | 2/2016 | Bronk | |
| 2016/0063786 A1 | 3/2016 | Lewis et al. | |
| 2016/0087485 A1 | 3/2016 | Maeda et al. | |
| 2016/0150407 A1 | 5/2016 | Michaud et al. | |
| 2017/0018128 A1 | 1/2017 | Berezin et al. | |
| 2017/0062938 A1 | 3/2017 | Cheng et al. | |
| 2017/0104589 A1 | 4/2017 | Lambert et al. | |
| 2017/0132533 A1 | 5/2017 | Darnell et al. | |
| 2017/0236351 A1 | 8/2017 | Menard et al. | |
| 2017/0303080 A1 | 10/2017 | Stitt et al. | |
| 2017/0303090 A1 | 10/2017 | Stitt et al. | |
| 2017/0309098 A1 | 10/2017 | Watters et al. | |
| 2017/0330402 A1 | 11/2017 | Menard et al. | |
| 2018/0029560 A1 | 2/2018 | Mohaupt et al. | |
| 2018/0084412 A1* | 3/2018 | Alfred | H04L 67/28 |
| 2018/0099643 A1 | 4/2018 | Golsch et al. | |
| 2018/0103414 A1 | 4/2018 | Golsch | |
| 2018/0126952 A1 | 5/2018 | Niemiec | |
| 2018/0154865 A1 | 6/2018 | Bianchi, III et al. | |
| 2018/0217945 A1* | 8/2018 | Li | G06F 12/1425 |
| 2018/0269565 A1 | 9/2018 | Guthrie et al. | |
| 2019/0135229 A1* | 5/2019 | Ledvina | H04W 12/003 |

FOREIGN PATENT DOCUMENTS

| | | |
|---|---|---|
| EP | 2800068 A2 | 11/2014 |
| EP | 3297247 A1 | 3/2018 |
| FR | 3026212 A1 | 3/2016 |
| WO | WO-2015177298 A1 | 11/2015 |
| WO | WO-16156682 A1 | 10/2016 |
| WO | WO-2017/181035 A1 | 10/2017 |
| WO | WO-2017/181050 A1 | 10/2017 |
| WO | WO-18040641 A1 | 3/2018 |

* cited by examiner

SYSTEMS AND METHODS FOR COMMUNICATION BUS SECURITY IN A VEHICLE

CROSS-REFERENCE TO RELATED APPLICATION

This application claims the benefit of U.S. Provisional Application No. 62/648,987, filed on Mar. 28, 2018. The entire disclosure of the above application is incorporated herein by reference.

FIELD

The present disclosure relates to systems and methods for preventing unauthorized devices from attacking passive entry/passive start systems and, more specifically, to systems and methods for preventing unauthorized devices from attacking passive entry-passive start systems by hacking into vehicle communication bus systems, such as LIN bus communication systems or CAN bus communication systems.

BACKGROUND

This section provides background information related to the present disclosure which is not necessarily prior art.

Traditionally, a passive entry/passive start (PEPS) system, which is a vehicle system that includes a keyless entry system, allows anyone in possession of a key fob that has been previously paired with a vehicle's central PEPS electronic control unit (ECU) to access the vehicle by simply grabbing the door handle and to start the vehicle with a push of a button. In response to a button push, the central PEPS ECU authenticates the key fob to determine if the key fob is authorized to access the vehicle and uses the signal strength indicated by a plurality of vehicle antennas to estimate the location of the Key Fob. If the Key Fob can be authenticated and is located within an authorizing zone, the vehicle's function is made available to the user (i.e. doors are unlocked or vehicle is started).

However, traditional PEPS systems include physical vulnerabilities that may subject the PEPS systems to malicious attacks. As an example, a user may attack a PEPS system by connecting a device to the vehicle's on-board diagnostics (OBD-II) port. Using the device, the user may manipulate signals of and/or inject signals into a controller area network (CAN) and/or local interconnect network (LIN) of the vehicle, thereby providing the user the ability to activate/deactivate vehicle functions. As another example, the user may attack a PEPS system via a compact-disc (CD) player and pass-through devices of the vehicle. Specifically, the user may insert a CD into a CD player of a vehicle, and the CD may include instructions that discretely inject signals into the CAN and/or LIN of the vehicle while executing, for example, a windows media audio (WAN) or a moving picture experts group layer-3 audio (MP3) file.

Additionally, traditional PEPS systems include wireless vulnerabilities that may subject the PEPS systems to malicious attacks. As an example, a user may attack a PEPS system by passive eavesdropping, man-in-the-middle (MITM) attacks, and identity tracking of various telemetric links of the PEPS system.

SUMMARY

This section provides a general summary of the disclosure, and is not a comprehensive disclosure of its full scope or all of its features.

The present disclosure provides a system that includes a sensor that is configured to generate a first link key data packet. The system includes a control module of a vehicle, and the control module is configured to generate a second link key data packet. In response to (i) a first authenticated response of the first link key data packet matching a second authenticated response of the second link key data packet and (ii) a user device being connected to a communication gateway of the control module by a wireless communication link, the sensor is configured to communicate signal information to the control module using a hardwire link that electrically couples the control module and the sensor. The signal information includes information corresponding to characteristics of communication signals sent via the wireless communication link.

In some configurations, the first authenticated response is generated based on a first pre-link key and a random challenge value of the control module.

In some configurations, the first pre-link key is generated in response to a user entering a PIN on an interface of at least one of the sensor and the user device.

In some configurations, the random challenge value of the control module is a random number generated by the control module.

In some configurations, the sensor generates the first authenticated response by performing a cryptographic operation on the first pre-link key and the random challenge value.

In some configurations, the second authenticated response is generated based on a second pre-link key and an identification value.

In some configurations, the identification value is configured to uniquely identify the sensor from a plurality of sensors.

In some configurations, the control module generates the second authenticated response by performing a cryptographic operation on the second pre-link key and the identification value.

In some configurations, in response to the first authenticated response indicating that an unauthorized device is electrically coupled to the control module, the control module is configured to transmit a message to the user device. The message indicates that the unauthorized device is attempting to communicate with the control module.

In some configurations, the hardwire link includes a local interconnect network (LIN) and the wireless communication link is a Bluetooth Low Energy (BLE) communication link.

Additionally, the present disclosure provides a method that includes generating, using a sensor, a first link key data packet. The method includes generating, using a control module of a vehicle, a second link key data packet, and the control module includes at least one processor that is configured to execute instructions stored in a nontransitory memory. The method further includes determining, using the control module, whether a first authenticated response of the first link key data packet matches a second authenticated response of the second link key data packet. The method further includes determining, using the control module, whether a user device is connected to a communication gateway of the control module by a wireless communication link. The method further includes, in response to (i) the first authenticated response matching the second authenticated response and (ii) the user device being connected to the communication gateway of the control module by the wireless communication link, communicating, using the sensor, signal information to the control module using a hardwire link that electrically couples the control module and the sensor. The signal information includes information corresponding to characteristics of communication signals sent via the BLE communication link.

In some configurations, the method comprises generating, using the sensor, the first authenticated response based on a first pre-link key and a random challenge value of the control module.

In some configurations, the method further comprises generating, using the sensor, the first pre-link key in response to a user entering a PIN on an interface of at least one of the sensor and the user device.

In some configurations, the random challenge value of the control module is a random number generated by the control module.

In some configurations, the method further comprises generating, using the sensor, the first authenticated response by performing a cryptographic operation on the first pre-link key and the random challenge value.

In some configurations, the method further comprises using the control module, the second authenticated response based on a second pre-link key and an identification value.

In some configurations, the identification value is configured to uniquely identify the sensor from a plurality of sensors.

In some configurations, the method further comprises generating, using the control module the second authenticated response by performing a cryptographic operation on the second pre-link key and the identification value.

In some configurations, the method further comprises, in response to the first authenticated response indicating that an unauthorized device is electrically coupled to the control module, transmitting, using the control module, a message to the user device. The message indicates that the unauthorized device is attempting to communicate with the control module.

In some configurations, the hardwire link includes a local interconnect network (LIN) and the wireless communication link is a Bluetooth Low Energy (BLE) communication link.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure relates to systems, methods, and architecture to implement a localization system, such as a PEPS system, using a consumer grade wireless protocol, such as, for example, a consumer grade wireless protocol based on the standardized specification of the Bluetooth Consortium. Specifically, the present disclosure relates to a PEPS system using a Bluetooth Low Energy (BLE) communication protocol for communication between the vehicle and a BLE-enabled user device, such as a smartphone or a wearable device. Specifically, the PEPS system includes a sensor network that is configured to find existing connections between the user device and the vehicle and to measure the timing and signal characteristics of the communication between the user device and the vehicle. Further, the PEPS system also includes a control module that collects physical characteristics measured by the sensor network. Based on the physical characteristics, the control module may determine a location of the user device. Alternatively, while the present disclosure describes establishing a wireless communication connection using Bluetooth or BLE, the systems and methods described herein could be used with other wireless communication protocols, such as Wi-Fi, Wi-Fi direct, ultra-wide band (UWB) communication, and/or impulse-radio (IR) UWB communication.

Additionally, each sensor of the sensor network may communicate with the control module via a hardwire connection. Moreover, in order to enhance the security of the communications between the sensors of the sensor network and the control module, each of the sensors is associated with a link key, and the control module receives the communication from each of the sensors if the corresponding link key matches a link key of the control module.

Figure 1:
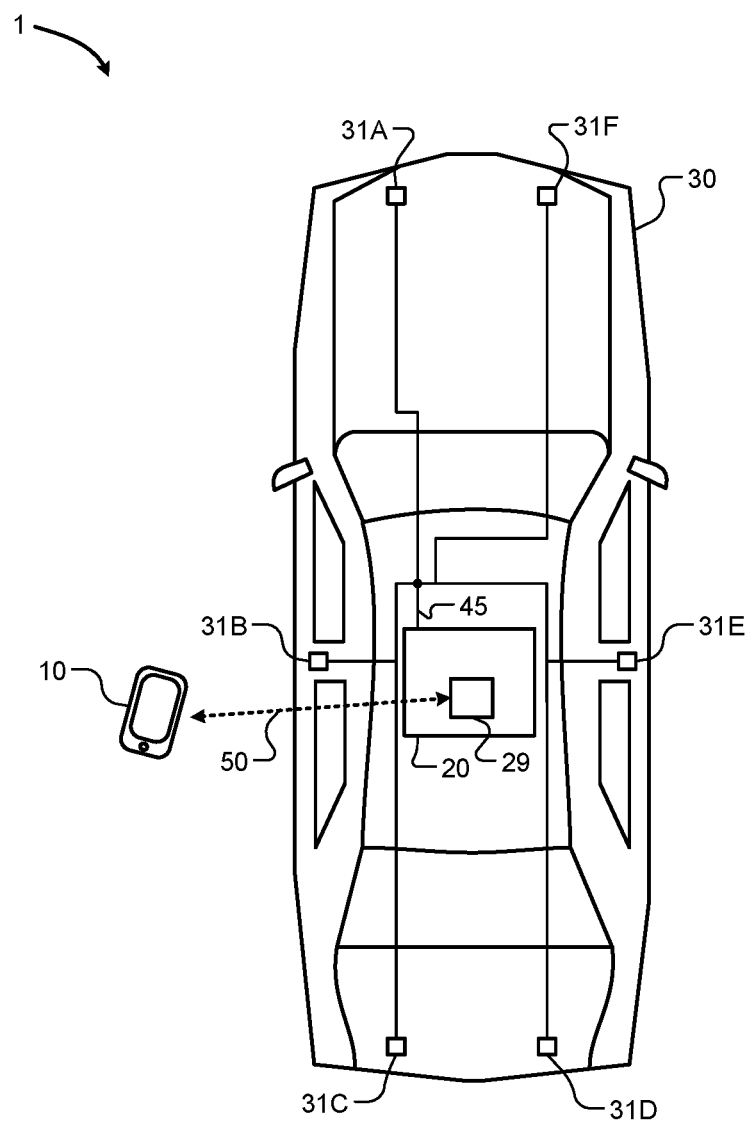
FIG. 1 illustrates a subject vehicle with a PEPS system according to the present disclosure.
Figure 2:
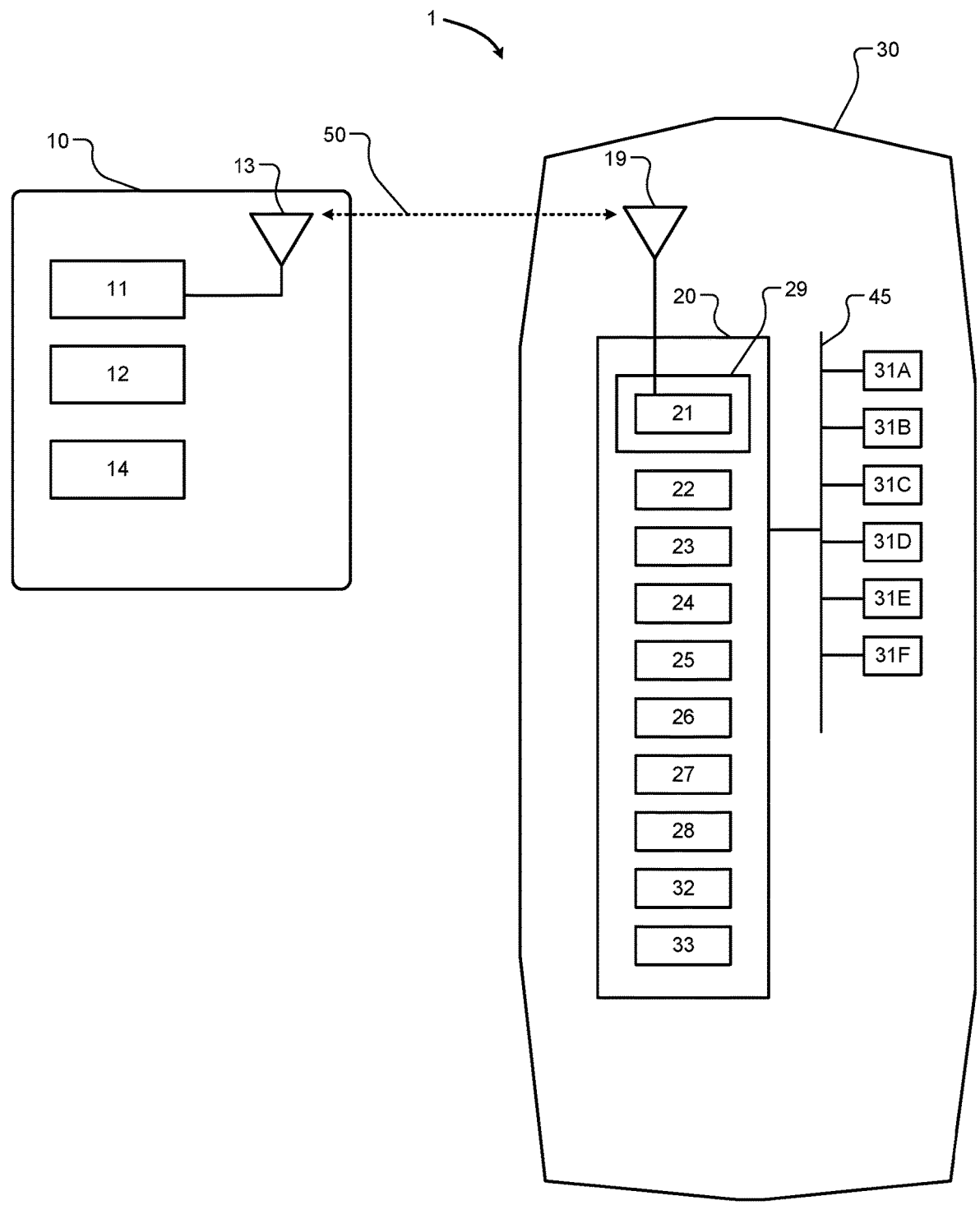
FIG. 2 illustrates a block diagram for a PEPS system according to the present disclosure.

With reference to FIGS. 1-2, a PEPS system 1, which may also be referred to as a localization system, is provided within a vehicle 30 and includes a communication gateway 29 and a plurality of sensors 31A-31F, referred to collectively as sensors 31. The PEPS system 1 includes a control module 20. Additionally or alternatively, the PEPS system includes a plurality of control modules 20 that are distributed throughout the vehicle 30 and are able to communicate with each other through, for example, a vehicle interface 45. In addition, some of the control modules 20 may be integrated into a single electronic control unit (ECU) or are able to communicate with each other using the vehicle interface 45. The vehicle interface 45, for example, may include a controller area network (CAN) bus for communication between main modules and/or lower data rate communication such as local interconnect network (LIN) for communication between the sensors 31. The vehicle interface 45 can also include a clock extension peripheral interface (CXPI) bus. Additionally or alternatively, the vehicle interface 45 can include a combination of CAN bus, LIN, and CXPI bus communication interfaces. The structure of the sensors 31 are discussed in further detail below with reference to FIG. 3.

The control module 20 may also include one or more processors that are configured to execute instructions stored in a nontransitory memory, such as a read-only memory (ROM) and/or random access memory (RAM).

The control module 20 can include, for example, the communication gateway 29 that includes a BLE chipset 21 connected to an antenna 19. As shown in FIG. 2, the antenna 19 may be located in the vehicle 30. Alternatively, the antenna 19 may be located outside of the vehicle 30 or within the control module 20. The control module 20 can also include a link authentication module 22 that authenticates a user device 10 for communication via a communication link 50. The control module 20 can also include a data management layer 23 for push data. The control module 20 can also include a connection information distribution module 24. The control module 20 can also include a timing control module 25. The control module 20 can also include a telematics module 26, such as a global positioning system (GPS) module and/or other navigation or location modules. The control module 20 can also include a PEPS module 27. The control module 20 can also include a body control module 28. The control module 20 can also include a sensor processing and localization module 32. The control module 20 can also include a security filtering module 33.

As shown in FIGS. 1-2, the user device 10 can communicate with the communication gateway 29 of the vehicle 30 via the communication link 50. Without limitation, the user device 10 may be any Bluetooth enabled communication device, such as a smart phone, smart watch, wearable electronic device, key fob, tablet device, or other device associated with a user of the vehicle 30, such as an owner, driver, passenger of the vehicle 30, and/or a technician for the vehicle 30. As noted above, other wireless communication protocols could be used in place of Bluetooth or BLE, such as Wi-Fi, Wi-Fi direct, UWB, and/or IR USB. The user device 10 can include a BLE chipset 11 connected to an antenna 13. The user device 10 can also include application software 12 stored in a computer-readable storage module or device, such as a read-only memory (ROM) or a random-access memory (RAM). Further, the application software 12 includes instructions that are executable by a processor of the user device 10. The user device 10 can also include a GPS module 14 or other device location service.

The user device 10 and the communication gateway 29 can establish the communication link 50 using a Bluetooth communication link, as provided for and defined by the Bluetooth specification. For example, the communication link 50 between the user device 10 and the communication gateway 29 can be a BLE communication link. Alternatively, as noted above, a Wi-Fi, Wi-Fi direct, UWB, and/or IR UWB communication link may be used in place of the BLE communication link.

The PEPS system 1 may be configured to provide additional authentication of the communication link 50 with the user device. For example, the communication gateway 29 can communicate with the link authentication module 22 to authenticate the user device 10 and establish the communication link 50. For example, the link authentication module 22 can be configured to implement challenge-response authentication. In such case, timing information about the communication between the communication gateway 29 and the user device 10 is sent to the timing control module 25, which communicates with the sensors 31 through the vehicle interface 45, as described below. Further, the communication gateway 29 can communicate information about communication channels and channel switching parameters to the connection information distribution module 24. The connection information distribution module 24 is configured to communicate with each of the sensors 31 using the vehicle interface 45 and to provide the sensors 31 with communication information necessary for the sensors 31 to find and then follow the communication link 50 once the sensors 31 are synchronized with the communication gateway 29.

While FIGS. 1 and 2 illustrate a PEPS system 1 with six sensors 31A-31F, any number of sensors can be used. For example, the PEPS system can include four, five, seven, eight, nine, or more sensors. In this way, while the present disclosure provides an example utilizing six sensors, additional or fewer sensors can be used in accordance with the present disclosure.

Figure 3:
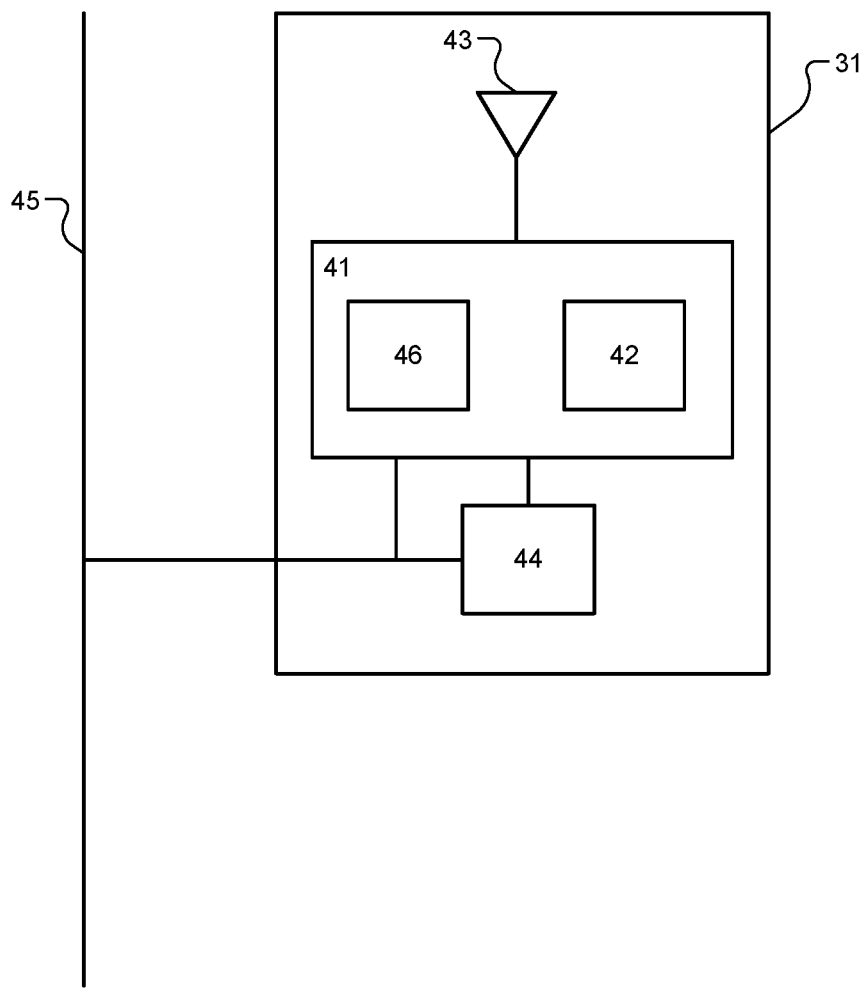
FIG. 3 illustrates a block diagram for a sensor of a PEPS system according to the present disclosure.

With reference to FIG. 3, each of the sensors 31 includes a BLE chipset 41 connected to an antenna 43. As shown in FIG. 3, the antenna 43 may be located internal to the sensors 31. Alternatively, the antenna 43 may be located external to the sensors 31. The sensors 31 receive BLE Signals using the antenna 43 and, specifically, receive BLE physical layer messages using a BLE physical layer (PHY) controller 46. The sensors 31 are capable of observing BLE physical layer messages and taking measurements of the physical properties of the associated signals, including, for example, the received signal strength (RSSI) using a channel map that is produced by a channel map reconstruction module 42. Additionally or alternatively, the sensors 31 can determine other measurements of the physical properties of the associated signals, including, for example, data related to the angle of arrival. Additionally or alternatively, the sensors 31 can communicate with each other and/or communicate with the communication gateway 29 via the vehicle interface 45 to determine time difference of arrival, time of arrival, or angle of arrival data for signals received by multiple sensors. Additionally or alternatively, the sensors 31 can measure and determine round trip time of flight information about signals sent and received to and from the user device 10. The sensors 31 receive timing information and channel map information from the communication gateway 29 via the vehicle interface 45. A timing synchronization module 44 is configured to accurately measure the reception times of messages on the vehicle interface 45 and pass the timing information to the BLE chipset 41. The BLE chipset 41 is configured to take the channel map information and the timing signals and to tune the PHY controller 46 to a specific channel at a specific time and observe all physical layer messages and data that conform to the Bluetooth physical layer specification, which includes the normal data rates proposed or adopted, for example, in the Bluetooth Specification version 5.0. The data, timestamps and measured signal strength are reported by the BLE chipset 41 to the communication gateway 29 and/or control module 20 via the vehicle interface 45.

Figure 4:
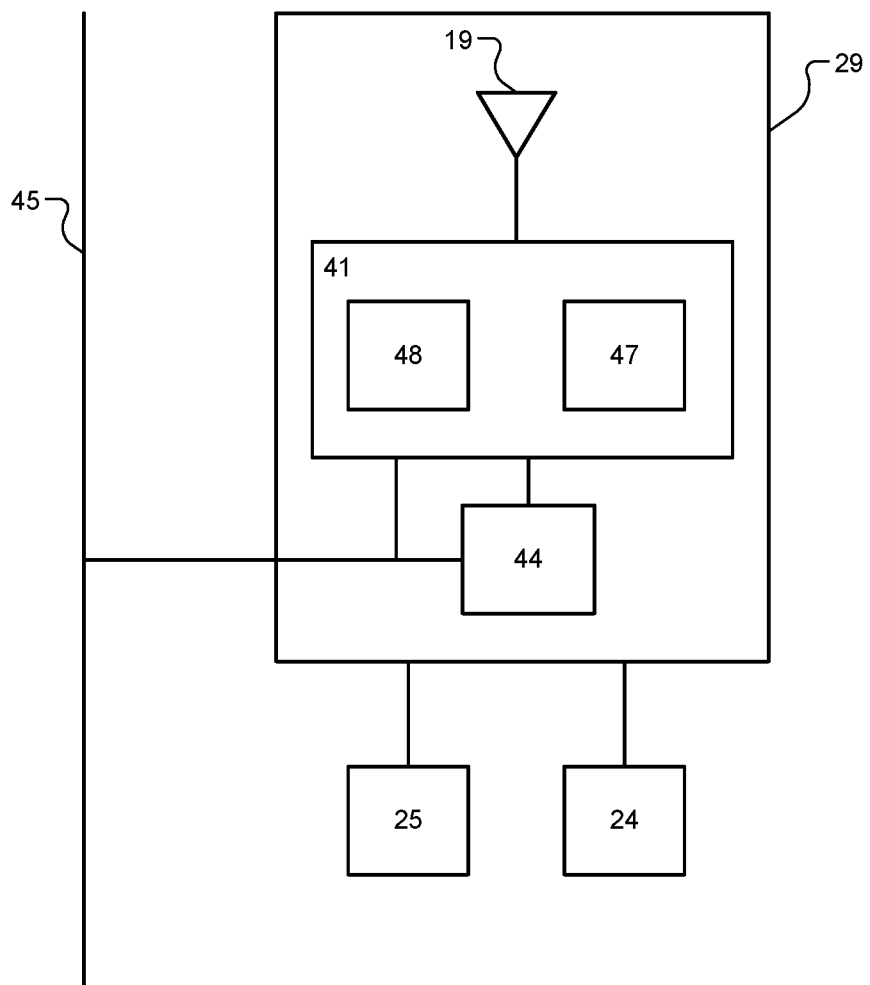
FIG. 4 illustrates a communication gateway of a PEPS system according to the present disclosure.

With reference to FIG. 4, the communication gateway 29 includes a BLE chipset 41 connected to an antenna 19 to receive BLE Signals. The BLE chipset 41 implements a Bluetooth protocol stack 48 that is, for example, compliant with the BLE specification, including, for example, version 5 of the BLE specification. The BLE chipset 41 also includes an application 47 implemented by application code stored in a computer-readable medium, such as a read-only memory (ROM) or a random-access memory (RAM). Further, the application 47 includes instructions that are executable by a processor of the BLE chipset 41. The application 47 may include modifications outside of the Bluetooth specification to enable the BLE chipset 41 to inspect timestamped data transmitted and received by the BLE chipset 41, regardless of the validity of the data. For example, the application 47 enables the BLE chipset 41 to compare transmitted and received data against expectations. The communication gateway 29 is configured to transmit the actual transmitted and received data to the control module 20 of the vehicle 30 via the vehicle interface 45. Alternatively, the communication gateway 29 can be configured to receive the data from each of the sensors 31 via the vehicle interface 45. The application 47 can be further configured to enable the BLE chipset 41 to confirm that each of the sensors 31 has received the correct data at the correct time.

With continued reference to FIG. 4, the communication gateway 29 is further configured to provide information about ongoing connections and timing signals necessary for each of the sensors 31 to find the connection being maintained by the communication gateway 29 with the user device 10, for example, and to subsequently follow the connection. The Bluetooth protocol stack 48 is configured to provide the channel map, access identifier, next channel, and the time to the next channel to the application 47. The Bluetooth protocol stack 48 is configured to output timing signals for the timestamps of transmission and reception events to the application 47 and/or a digital PIN output of the BLE chipset 41. The communication gateway 29 also includes a timing synchronization module 44. The timing synchronization module 44 is configured to accept the timing signals and works in conjunction with the vehicle interface 45 to create accurate time stamps of connection information messages and other communications.

Figure 5A:
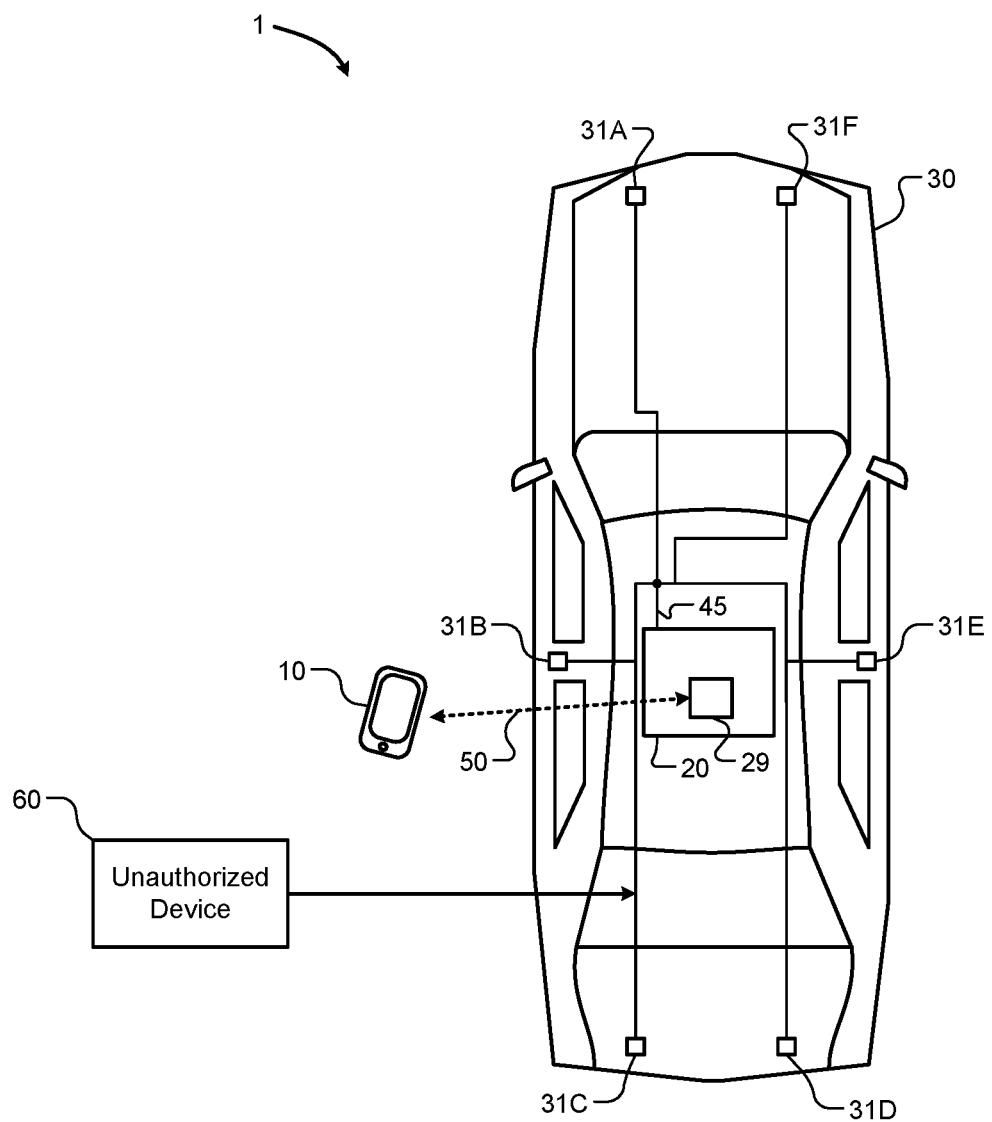
FIGS. 5A-5B illustrate a subject vehicle with a PEPS system and an unauthorized device according to the present disclosure.
Figure 5B:
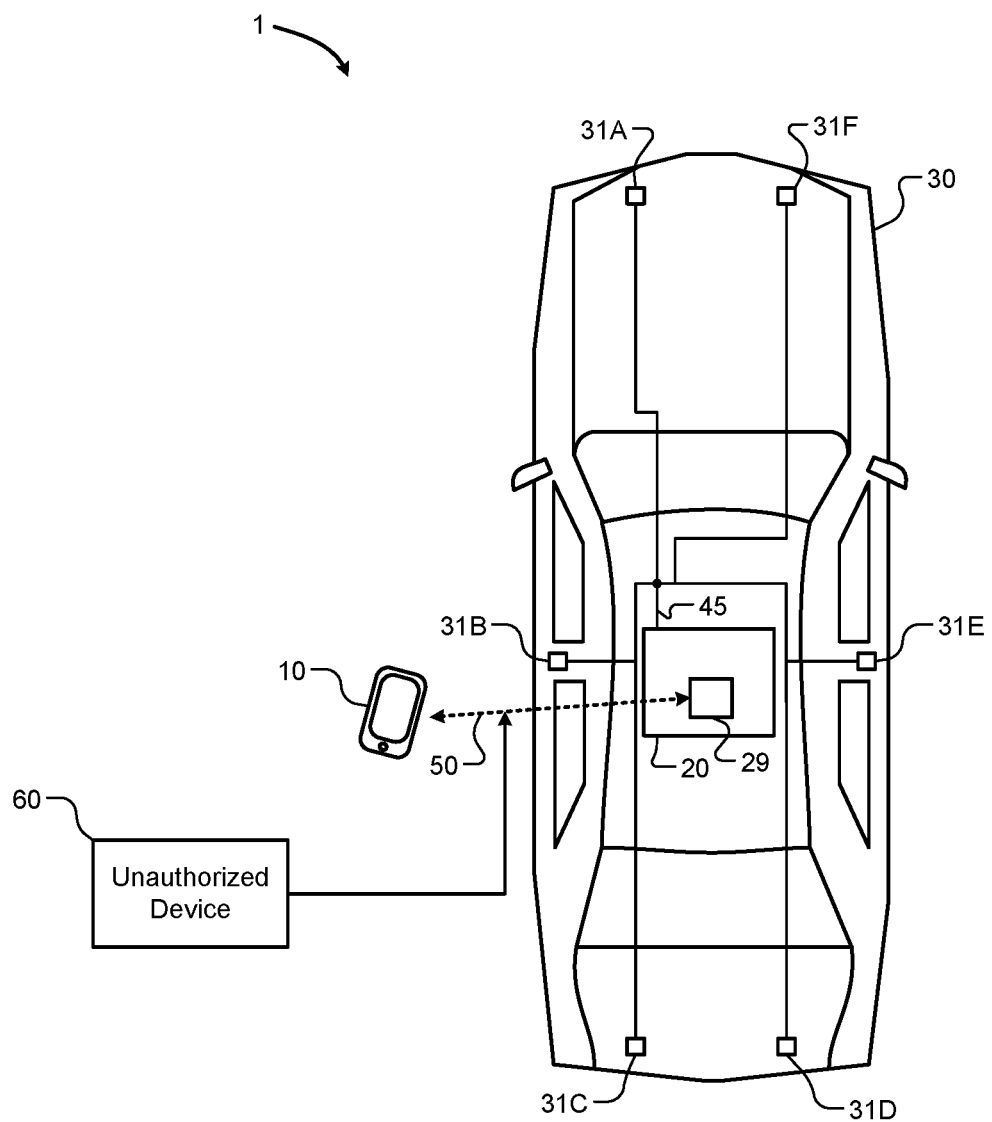

With reference to FIGS. 5A-5B, the PEPS system 1 is provided within the vehicle 30 and includes the communication gateway 29 and the sensors 31. As described above, the sensors 31 are configured to take measurements of the physical properties of the BLE signal transmitted by the user device 10 to the communication gateway 29 via the communication link 50. The sensors 31 may measure, for example, the RSSI of the BLE signal and data related to the angle of arrival of the communication link 50. Additionally, the sensors 31 may be configured to determine the time difference of arrival, time of arrival, angle of arrival, and/or round trip time of flight data of the BLE signal. Using the physical properties and/or data of the BLE signal, the communication gateway 29 and/or control module 20 may then determine a distance between the user device 10 and the vehicle 30.

As an example, in response to the communication gateway 29 being connected to the user device 10 via the communication link 50, the communication gateway 29 may provide the sensors 31 data corresponding to the BLE signal transmitted by the user device 10. In response to the data corresponding to the BLE signal provided by the communication gateway 29 matching the data corresponding to a BLE signal acquired by the sensors 31 from the user device 10 (e.g., a BLE communication packet received by the sensors 31 from the communication gateway 29 matches the BLE communication packet received by the sensors 31 from the user device 10), the sensors 31 are configured to generate RSSI measurements of the BLE signal.

The sensors 31 may then provide the RSSI measurements to the control module 20 via the vehicle interface 45, which may be implemented by a LIN bus. For example, the sensors 31 may communicate using Bluetooth communication packets, albeit over wired (instead of wireless) connections to the control module 20. Furthermore, the sensors 31 may provide the RSSI measurements to the control module 20 if a first authenticated response of a first link key data packet of each of the sensors 31 matches a second authenticated response of a second link key data packet. The first authenticated response, the second authenticated response, the first link key data packet, and the second link key data packet are described below in further detail with reference to FIG. 6. In response to the control module 20 receiving the RSSI measurements from the sensors 31, the control module 20 may determine the location of the user device 10, the distance between the user device 10 and the vehicle 30, and/or trajectory of the user device 10 based on the RSSI measurements received from the sensors 31.

Based on the location of the user device 10, the distance between the user device 10 and the vehicle 30, and/or trajectory of the user device 10, the control module 20 may activate certain vehicle functions, such as setting mirror positions, adjusting a steering wheel position, adjusting a seat position of a driver, modifying climate control settings, adjusting audio/media settings, unlocking a door of the vehicle, unlocking a trunk of the vehicle, activating a lighting system of the vehicle, starting the vehicle, etc.

However, the RSSI measurements provided to the control module 20 may be tampered with and/or manipulated by an unauthorized device 60. As an example and as shown in FIG. 5A, the unauthorized device 60 may be configured to manipulate signals of and/or directly inject signals into the vehicle interface 45 if the unauthorized device 60 is connected to the (OBD-II) port, thereby providing the user the ability to activate/deactivate certain vehicle functions.

Additionally or alternatively and as shown in FIG. 5B, the unauthorized device 60 may be configured to manipulate signals of and/or directly inject signals into the vehicle interface 45 via the communication link 50 based on wireless vulnerabilities of the PEPS system 1. As an example, the unauthorized device 60 may be configured to perform passive eavesdropping, MITM attacks, and identity tracking attacks. As another example, the unauthorized device 60 may be configured to perform a radio frequency (RF) isolation attack, as described in detail in U.S. patent application Ser. No. 15/730,265 filed on Oct. 11, 2017 by DENSO International America, Inc., which is incorporated herein by reference in its entirety.

Figure 6:
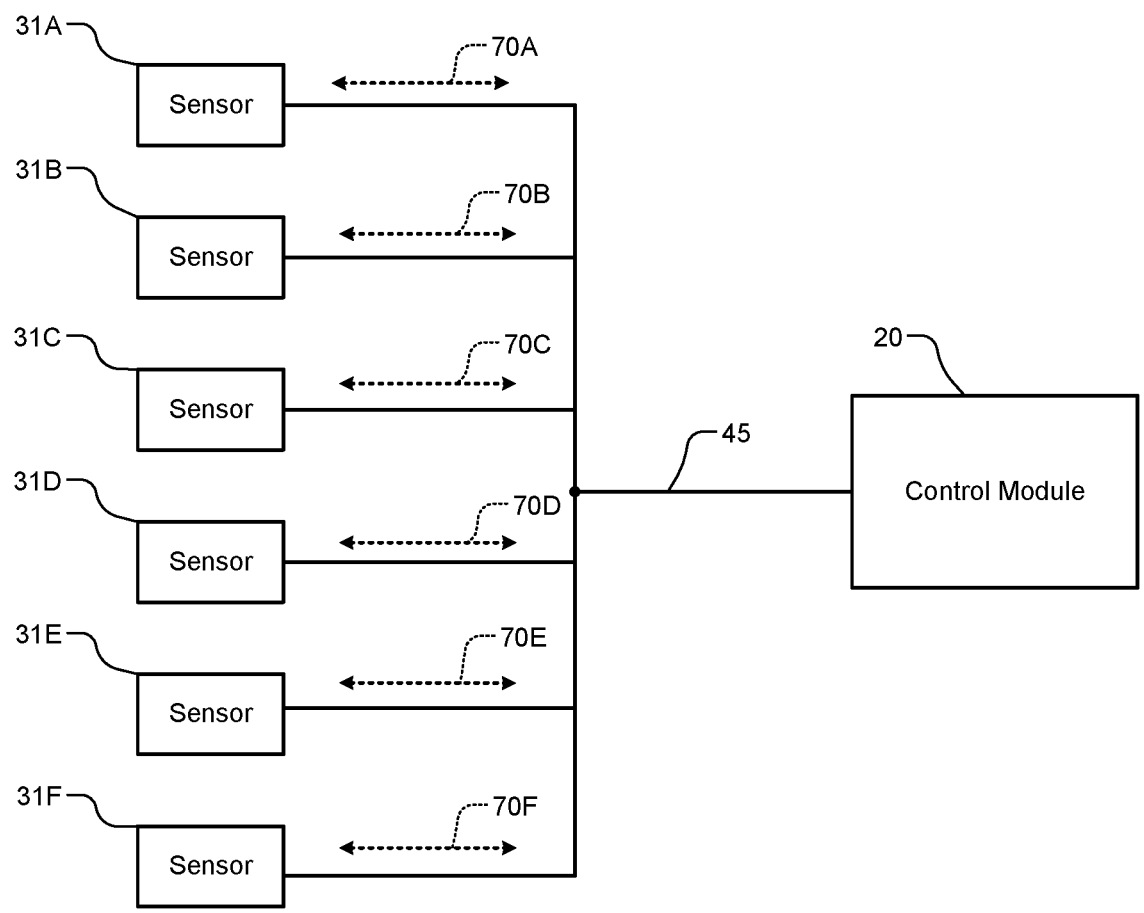
FIG. 6 illustrates a plurality of link keys for each sensor of the PEPS system according to the present disclosure.

With reference to FIG. 6, a plurality of link keys for each sensor of the PEPS system is shown. As shown in FIG. 6 and as described above, the sensors 31 are configured to communicate with the control module 20 using the vehicle interface 45, which may be implemented by a LIN bus. Moreover, in order to prevent tampering and/or attacks from the unauthorized device 60, each of the sensors 31 are configured to generate, using a corresponding BLE chipset 41, a first link key data packet, and the control module 20 is configured to generate second link key data packets, and each of the second link key data packets is associated with one of the sensors 31. As an example, sensor 31A generates a first link key data packet, and the control module 20 generates a second link key data packet that is associated with sensor 31A. If an authenticated response of the first link key data packet matches an authenticated response of the second link key data packet, the control module 20 generates link key 70A. In response to generating link key 70A, sensor 31A and control module 20 are configured to communicate using the vehicle interface 45. The first link key data packet, the second link key data packet, and the authenticated responses are described below in further detail.

If the authenticated response of the first link key data packet does not match the authenticated response of the second link key data packet, the control module 20 does not generate the link key 70A and, therefore, the control module 20 does not communicate with sensor 31A. Moreover, the control module 20 may report that an unauthorized device 60 is attempting to attack the PEPS system 1, as described below in further detail.

While the above embodiment describes generating link key 70A if the authenticated response of the first link key data packet matches the authenticated response of the second link key data packet, the authenticated response matching may also be performed for each of the sensors 31B-31F to generate corresponding link keys 70B-70F (link keys 70A-70F collectively referred to as link keys 70).

Each of the first link key data packets may include a first pre-link key, and the first pre-link key may be generated when the corresponding sensor is electrically coupled to the control module 20 via the vehicle interface 45 and the user inputs a PIN corresponding to the sensor. As an example, the first pre-link key of sensor 31A may be a 128-bit number that is generated in response to a user entering a corresponding PIN on an interface of the sensor 31A or using an application interface of an application executing on the user device 10, wherein the application is configured to enable communication between the user device 10 and the sensor 31A. Additionally, the first link key data packet may also include an identification value that uniquely identifies the corresponding sensor. As an example, the identification value of sensor 31A may be a 48-bit address that uniquely identifies sensor 31A. Furthermore, the identification value of the corresponding sensor may be provided to the control module 20.

Each of the second link key data packets may include a second pre-link key, and the second pre-link key may be generated when a sensor is electrically coupled to the control module 20 via the vehicle interface 45. As an example, the second pre-link key of the control module 20 may be a 128-bit number that is based on a value assigned to the control module 20 by a manufacturer and/or developer of the control module 20. Each of the second link key data packets may also include a random challenge value that is generated when the corresponding sensor is coupled to the control module 20 via the vehicle interface 45. As an example, the random challenge value may be represented by a random 32-bit number generated by the control module 20. Furthermore, each of the random challenge values is provided to a corresponding sensor.

Each of the sensors 31 is configured to generate the first authenticated response based on the corresponding random challenge value and the corresponding first pre-link key. Additionally, the control module 20 is configured to generate the corresponding second authenticated responses based on the identification value of the corresponding sensor and the second pre-link key. As an example, the sensors 31 and the control module 20 may perform a cryptographic operation in order to generate the first authenticated response and the corresponding second authenticated response, such as a challenge-response authentication operation.

As described above, if the first authenticated response and the corresponding second authenticated response match, the control module 20 generates a corresponding link key. In response to generating the link key, the corresponding sensor and the control module 20 are configured to communicate using the vehicle interface 45. Otherwise, if the first authenticated response and the corresponding second authenticated response do no match, the control module 20 does not generate the corresponding link key, thereby preventing the corresponding sensor and the control module 20 from communicating using the vehicle interface 45.

Additionally or alternatively, if the first authenticated response and the corresponding second authenticated response do no match, and the first authenticated response indicates that it was not generated by one of the sensors 31 (e.g., the identification value indicates that it is an unauthorized device 60), the control module 20 may be configured to determine that the unauthorized device 60 is attempting to connect to the control module 20 via the vehicle interface 45. As such, the control module 20 may disable communication between the unauthorized device 60 and the control module 20 and report the presence of the unauthorized device 60 to, for example, a user device 10 that is associated with a user of the vehicle 30.

Figure 7:
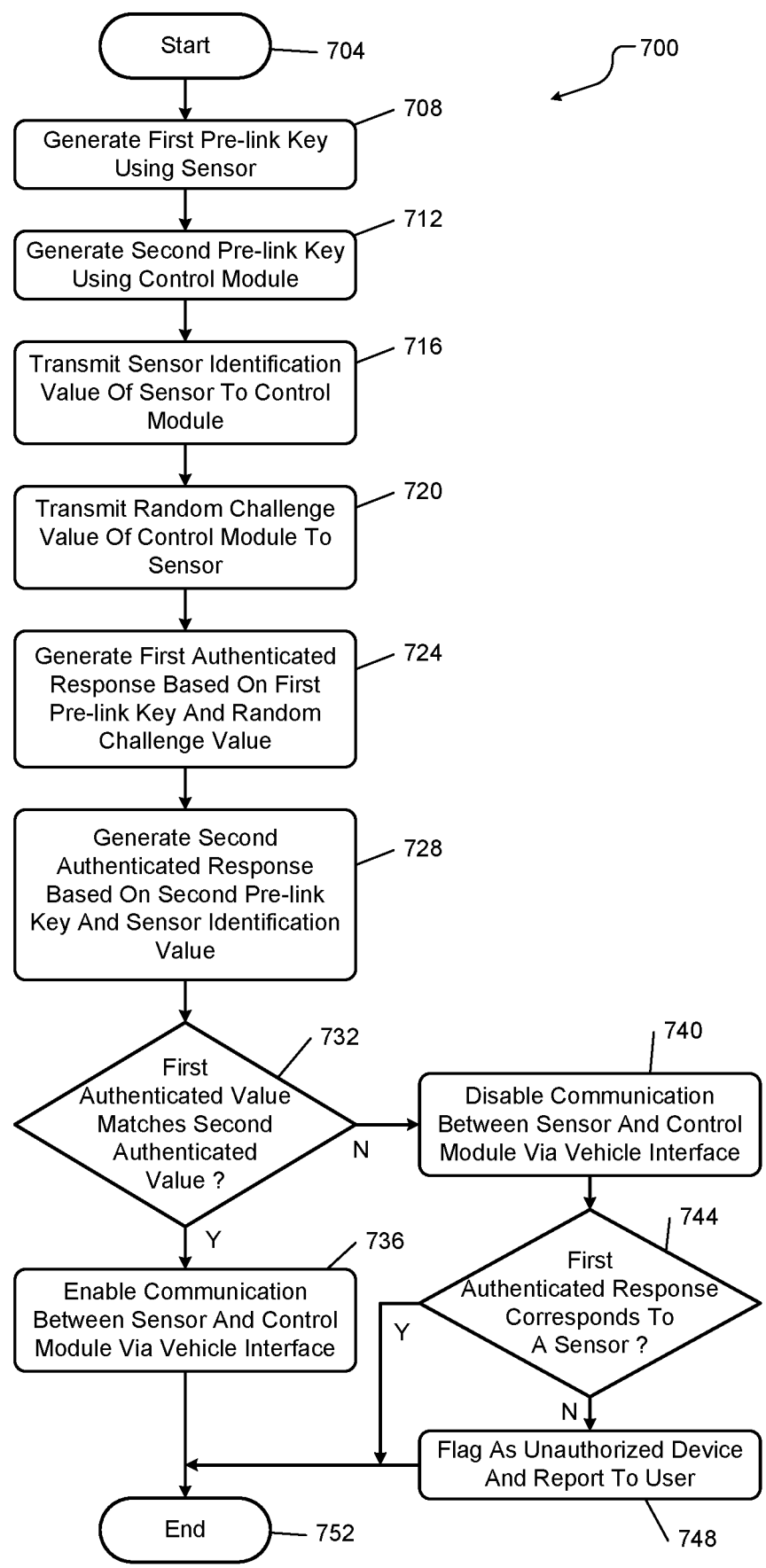
FIG. 7 illustrates a flowchart of an example algorithm for generating a link key according to the present disclosure.

With reference to FIG. 7, a flowchart of an example control algorithm 700 for generating a link key is shown. The control algorithm 700 begins at 704 when, for example, a user electrically couples a sensor to the control module 20. At 708, the control algorithm 700 generates, using the sensor, the first pre-link key. At 712, the control algorithm 700 generates, using the control module 20, the corresponding second pre-link key. At 716, the control algorithm 700 transmits, using the sensor, the identification value to the control module 20. At 720, the control algorithm 700 transmits, using the control module 20, the random challenge value to the sensor. At 724, the control algorithm 700 generates, using the sensor, the first authenticated response based on the first pre-link key and the random challenge value. At 728, the control algorithm 700 generates, using the control module 20, the corresponding second authenticated response based on the second pre-link key and the identification value.

At 732, the control algorithm 700 determines, using the control module 20, whether the first authenticated response matches the second authenticated value. If so, the control algorithm 700 proceeds to 736; otherwise, the control algorithm 700 proceeds to 740. At 736, the control algorithm 700 enables communication between the sensor and the control module 20 via the vehicle interface 45 and then proceeds to 752. At 740, the control algorithm 700 disables communication between the sensor and the control module 20 via the vehicle interface 45 and then proceeds to 744. At 744, the control algorithm 700 determines whether the first authenticated response corresponds to a sensor. If so, the control algorithm 700 proceeds to 752; otherwise, the control algorithm 700 proceeds to 748. At 748, the control algorithm 700 flags the sensor as an unauthorized device 60 and reports the presence of the unauthorized device 60 to, for example, the user device 10 associated with a user of the vehicle 30. At 752, the control algorithm 700 ends.

Figure 8:
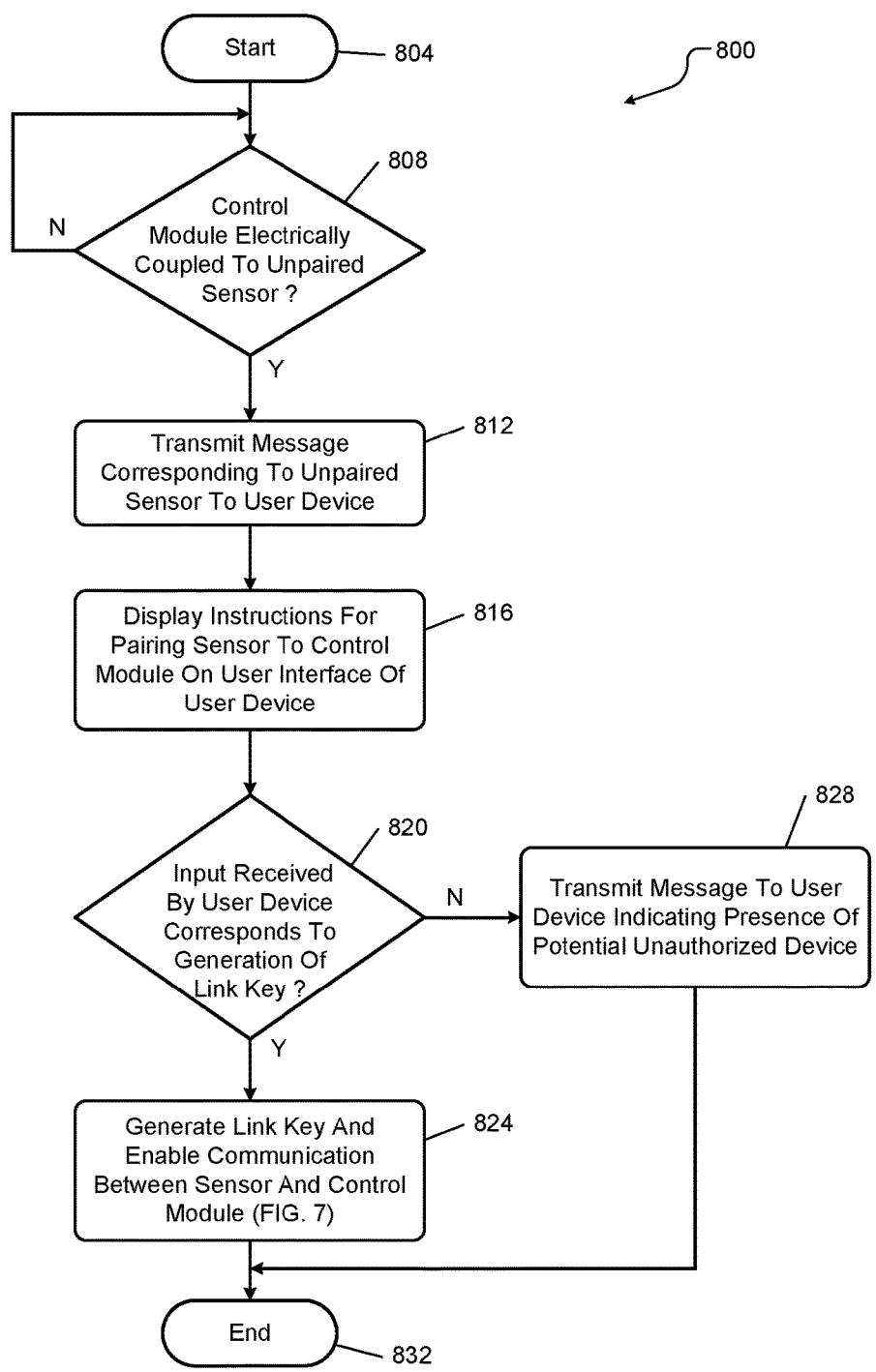
FIG. 8 illustrates a flowchart of an example algorithm for incorporating an unconnected sensor according to the present disclosure.

With reference to FIG. 8, a flowchart of an example control algorithm 800 for installing a new sensor is shown. The control algorithm 800 begins at 804 when, for example, a user obtains a new, unpaired sensor. At 808, the control algorithm 800 determines whether the control module 20 is electrically coupled to the unpaired sensor. If so, the control algorithm 800 proceeds to 812; otherwise, the control algorithm 800 remains at 808 until the control module 20 is electrically coupled to the unpaired sensor. At 812, the control algorithm 800 transmits, using the control module 20, a message corresponding to the presence of the unpaired sensor to the user device 10.

At 816, the control algorithm 800 displays, using a user interface of the user device 10, instructions for pairing the sensor to the control module 20. As an example, the user interface may display graphical user interface elements for inputting a PIN corresponding to the unpaired sensor. As another example, the user interface may display a message indicating that a new sensor has been electrically coupled to the control module 20, and the user interface may include graphical user interface elements that confirm that the user authorized the installation of the new sensor. Specifically, in order to confirm that the user authorized the installation of the new sensor, the graphical user interface elements are configured to, in response to a user selection, instruct the control module 20 to generate the link key.

At 820, the control algorithm 800 determines whether the user device 10 receives an input corresponding to instructing the control module 20 to generate the link key (e.g., does the user device 10 receive the correct PIN from the user). If so, the control algorithm proceeds to 824 and generates the link key and enables communication between the sensor and the control module 20, as described in FIG. 7. Otherwise, the control algorithm 800 proceeds to 828 and transmits a message to the user device 10 indicating the presence of a potential unauthorized device 60. The control algorithm 800 then ends at 832.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A system comprising:
a sensor that is configured to generate a first link key data packet;
a control module of a vehicle, wherein the control module is configured to generate a second link key data packet; and
in response to (i) a first authenticated response of the first link key data packet matching a second authenticated response of the second link key data packet and (ii) a user device being connected to a communication gateway of the control module by a wireless communication link, the sensor is configured to communicate signal information to the control module using a hardwire link that electrically couples the control module and the sensor, wherein the signal information includes information corresponding to characteristics of communication signals sent via the wireless communication link.

2. The system of claim 1, wherein the first authenticated response is generated based on a first pre-link key and a random challenge value of the control module.

3. The system of claim 2, wherein the first pre-link key is generated in response to a user entering a PIN on an interface of at least one of the sensor and the user device.

4. The system of claim 2, wherein the random challenge value of the control module is a random number generated by the control module.

5. The system of claim 2, wherein the sensor generates the first authenticated response by performing a cryptographic operation on the first pre-link key and the random challenge value.

6. The system of claim 1, wherein the second authenticated response is generated based on a second pre-link key and an identification value.

7. The system of claim 6, wherein the identification value is configured to uniquely identify the sensor from a plurality of sensors.

8. The system of claim 6, wherein the control module generates the second authenticated response by performing a cryptographic operation on the second pre-link key and the identification value.

9. The system of claim 1, wherein:
in response to the first authenticated response indicating that an unauthorized device is electrically coupled to the control module, the control module is configured to transmit a message to the user device; and
the message indicates that the unauthorized device is attempting to communicate with the control module.

10. The system of claim 1, wherein the hardwire link includes a local interconnect network (LIN) and the wireless communication link is a Bluetooth Low Energy (BLE) communication link.

11. A method comprising:
generating, using a sensor, a first link key data packet;
generating, using a control module of a vehicle, a second link key data packet, wherein the control module includes at least one processor that is configured to execute instructions stored in a nontransitory memory;
determining, using the control module, whether a first authenticated response of the first link key data packet matches a second authenticated response of the second link key data packet;
determining, using the control module, whether a user device is connected to a communication gateway of the control module by a wireless communication link; and
in response to (i) the first authenticated response matching the second authenticated response and (ii) the user device being connected to the communication gateway of the control module by the wireless communication link, communicating, using the sensor, signal information to the control module using a hardwire link that electrically couples the control module and the sensor, wherein the signal information includes information corresponding to characteristics of communication signals sent via the wireless communication link.

12. The method of claim 11, further comprising generating, using the sensor, the first authenticated response based on a first pre-link key and a random challenge value of the control module.

13. The method of claim 12, further comprising generating, using the sensor, the first pre-link key in response to a user entering a PIN on an interface of at least one of the sensor and the user device.

14. The method of claim 12, wherein the random challenge value of the control module is a random number generated by the control module.

15. The method of claim 12, further comprising generating, using the sensor, the first authenticated response by performing a cryptographic operation on the first pre-link key and the random challenge value.

16. The method of claim 11, further comprising generating, using the control module, the second authenticated response based on a second pre-link key and an identification value.

17. The method of claim 16, wherein the identification value is configured to uniquely identify the sensor from a plurality of sensors.

18. The method of claim 16, further comprising generating, using the control module the second authenticated response by performing a cryptographic operation on the second pre-link key and the identification value.

19. The method of claim 11, wherein:
  in response to the first authenticated response indicating that an unauthorized device is electrically coupled to the control module, transmitting, using the control module, a message to the user device; and
  the message indicates that the unauthorized device is attempting to communicate with the control module.

20. The method of claim 11, wherein the hardwire link includes a local interconnect network (LIN) and the wireless communication link is a Bluetooth Low Energy (BLE) communication link.

* * * * *